(No Model.)

J. KILLEFER.
ANIMAL TRAP.

No. 580,788. Patented Apr. 13, 1897.

Attest
F. L. Middleton
C. S. Middleton

Inventor
John Killefer
by Eric Spear
Atty

UNITED STATES PATENT OFFICE.

JOHN KILLEFER, OF LOS ANGELES, CALIFORNIA, ASSIGNOR OF ONE-HALF TO EDWIN DENSMORE, OF SAME PLACE.

ANIMAL-TRAP.

SPECIFICATION forming part of Letters Patent No. 580,788, dated April 13, 1897.

Application filed December 31, 1896. Serial No. 617,651. (No model.)

*To all whom it may concern:*

Be it known that I, JOHN KILLEFER, a citizen of the United States, residing at Los Angeles, in the county of Los Angeles and State of California, have invented certain new and useful Improvements in Animal-Traps, of which the following is a specification, reference being had therein to the accompanying drawings.

My invention relates to animal-traps of that class known as "jaw-traps" and in which the jaws and spring are formed of a single piece of wire. One objection to traps of this nature heretofore known to me is that they depend wholly on the trip or trigger to maintain the trap in its set position, and as in this position all the tension of the spring is thrown on the trip or trigger the friction not only renders the trip harder to move, but causes the small bearings to wear rapidly, so that the trap soon becomes unreliable in setting and worthless. Another objection is the difficulty in properly setting and adjusting the trip or trigger in such a trap, as it is necessary to hold the stiff jaws compressed with the fingers of one hand while the trip is accurately adjusted to the delicacy required for the particular animal for which it is set.

It is the object of my invention to overcome these objections and to provide a trap in which the jaws are set and retained in their set position independently of the trip or trigger.

A further object is to provide a trap in which the trigger may be readily adjusted to any desired degree of tension or delicacy after the trap is set and which is relieved of all strain of holding the jaws set.

I have further aimed to construct the trap in such a manner that it will be impossible for the animal to escape and to make it in simple, durable, and cheap form.

The invention is illustrated in the accompanying drawings, in which—

Figure 1:
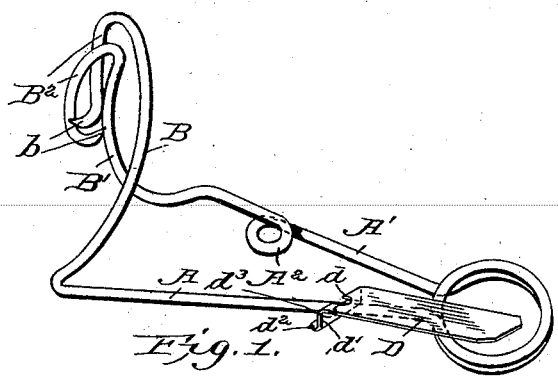
Figure 2:
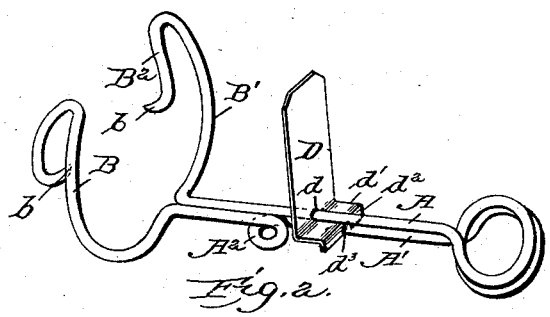

Figure 1 is a perspective view of the trap ready for setting, and Fig. 2 is a similar view of the trap after it has been set.

From the figures it will be seen that the trap comprises two spring-pressed arms A A', carrying the jaws B B', one of the arms carrying a lug or projection $A^2$, designed to engage the other arm to hold the trap in its set position, a trip D being carried by one of the arms, designed to spring them to disengage the projection from the other arm. The arms and jaws are preferably constructed of a single piece of strong spring-wire coiled upon itself at D to form the spring for forcing the jaws together. From this point the wires are extended parallel to each other for a distance to form the arms A A', one of which is bent or coiled upon itself, as at $A^2$, to form a lug or projection which when the jaws are forced apart to set the trap engages over the other arm to hold the trap in its set position. At the opposite end the arms are bent outwardly to form the jaws B B to encircle the body of the animal. Where only the wire jaws are depended on to hold the animal, this provision is often found insufficient. In order to overcome this objection, I double the wire at the lower ends of the jaws back upon itself, as shown at $B^2$, and then turn the ends $b$ inward and sharpen them, so that when the jaws grasp the animal the sharp points penetrate the flesh and effectually prevent its escape.

The trip D is carried by one of the arms and is adjustable longitudinally thereon to vary the delicacy of touch required to spring the trip. This trip is preferably formed, as shown, of a plate of sheet metal having an eye $d$ near its upper end through which the arm is passed. Above this the plate is bent at right angles, as shown at $d'$, and is then bent again at $d^2$ into a plane parallel with the main portion. This portion $d^2$ is preferably notched at $d^3$, so that the trip is retained in position centrally of the jaws.

In setting the trap the trip is preferably held in the position shown in Fig. 1, and the arms spring together until the catch or projection on one rides over and engages the other. The trip is then swung into a position at right angles to the arms (the space between the arms close to the coil being sufficient to permit this) and slid forward toward the point of engagement of the arms until the notch contacts with the adjacent arm.

Should a particularly delicate touch be desired, the trip is pushed still farther forward until the arms are almost disengaged, when the slightest backward push against the trigger will exert an upward push by the notched end thereof to instantly disengage the arms and spring the trap.

Having thus described my invention, what I claim is—

1. An animal-trap comprising the arms under spring tension, the jaws, a projection carried by one of the arms adapted to engage the other arm to hold the trap in its set position, and a trip independent of the projection for disengaging said arms to spring the trap, substantially as described.

2. An animal-trap comprising arms under spring tension, the jaws carried thereby, the projection on one arm adapted to engage the other arm to hold the trap set, and the adjustable trip independent of the projection for disengaging said arms, substantially as described.

3. An animal-trap comprising the arms under spring tension, the jaws, a projection on one arm adapted to engage the other arm to hold the trap set, and a trip comprising the plate adjustably connected to one arm having a bearing portion adapted to bear against the other arm, substantially as described.

4. An animal-trap comprising the arms under spring tension, the jaws, a projection on one arm adapted to engage the other arm to hold the trap set, a trip plate or lever having an eye near one end adapted to receive one arm, said lever having an angular extension adapted to bear against the other arm, substantially as described.

5. An animal-trap comprising the spring-operated arms, the jaws, a projection on one arm adapted to engage the other arm to hold the trap set, and a trip for disengaging said arms comprising the plate or lever having an eye near one end engaging one arm, an angular bearing extension carried by said lever, and the flange on said extension having a notch for engaging the other arm, substantially as described.

6. A trap consisting of a single piece of wire and comprising the coiled spring portion, the arms, one of said arms having a bent portion forming a catch or projection, the jaws, and the prongs arranged centrally of said jaws, and a trip for springing said trap, substantially as described.

In testimony whereof I affix my signature in presence of two witnesses.

JOHN KILLEFER.

Witnesses:
E. S. HUBBARD,
M. F. O'DEA.